United States Patent
Azuma et al.

(10) Patent No.: US 8,291,149 B2
(45) Date of Patent: Oct. 16, 2012

(54) STORAGE DEVICE AND STORAGE SYSTEM HAVING A HARD DISK DRIVE AND FLASH MEMORY

(75) Inventors: Shuichiro Azuma, Hino (JP); Masahiro Matsumoto, Akishima (JP); Takayuki Okinaga, Hannou (JP); Shigeru Takemura, Yokohama (JP); Yoshiyuki Kimata, Nagoya (JP); Takayuki Kishimoto, Fujimi (JP)

(73) Assignee: Hitachi ULSI Systems Co., Ltd., Tokyo (JP)

( * ) Notice: Subject to any disclaimer, the term of this patent is extended or adjusted under 35 U.S.C. 154(b) by 824 days.

(21) Appl. No.: 10/563,252

(22) PCT Filed: Jul. 5, 2004

(86) PCT No.: PCT/JP2004/009876
§ 371 (c)(1),
(2), (4) Date: Jan. 10, 2008

(87) PCT Pub. No.: WO2005/003952
PCT Pub. Date: Jan. 13, 2005

(65) Prior Publication Data
US 2008/0117548 A1 May 22, 2008

(30) Foreign Application Priority Data
Jul. 7, 2003 (JP) .................................. 2003-193007
Jan. 30, 2004 (JP) .................................. 2004-023266

(51) Int. Cl.
*G06F 12/00* (2006.01)
(52) U.S. Cl. ............... 711/2; 711/4; 711/103; 711/111; 711/112; 711/154; 711/170; 711/173

(58) Field of Classification Search .................. 711/2, 4, 711/103, 111, 112, 154, 170, 173
See application file for complete search history.

(56) References Cited

U.S. PATENT DOCUMENTS 5,860,083 A * 1/1999 Sukegawa .................... 711/103
(Continued)

FOREIGN PATENT DOCUMENTS

JP 04-351764 5/1991
(Continued)

OTHER PUBLICATIONS

Toshiba Corporation, "What is NAND Flash Memory?", Mar. 2003, File Memory Marketing & Promotion Department, Memory Division, TOSHIBA Semiconductor Company. Retrieved on Sep. 29, 2010 from <http://www.data-io.com/pdf/NAND/Toshiba/WhatIsNand.pdf.pdf>.*

(Continued)

*Primary Examiner* — Arpan P. Savla
(74) *Attorney, Agent, or Firm* — Stites & Harbison, PLLC; Juan Carlos A. Marquez, Esq.

(57) ABSTRACT

A storage device includes a drive selection section (1), a hard disk drive (HDD) (2), and a non-volatile memory drive (3). When an instruction such as a data I/O instruction is issued from a host such as a CPU (5) and an ATA controller (6) to the hard disk drive (HDD) (2), the drive selection section (1) receives the address value. If the address value is included in the address space predefined, the non-volatile memory drive (3) is made to execute the instruction. Otherwise, the hard disk drive (HDD) (2) is made to execute the instruction.

11 Claims, 11 Drawing Sheets

U.S. PATENT DOCUMENTS

| | | | |
|---|---|---|---|
| 6,249,838 B1 * | 6/2001 | Kon | 711/103 |
| 6,785,767 B2 * | 8/2004 | Coulson | 711/112 |
| 7,003,620 B2 * | 2/2006 | Avraham et al. | 711/103 |
| 7,017,037 B2 * | 3/2006 | Fortin et al. | 713/2 |
| 7,127,549 B2 * | 10/2006 | Sinclair | 711/100 |
| 2002/0004849 A1 * | 1/2002 | Eigen et al. | 709/310 |
| 2002/0019700 A1 * | 2/2002 | Ishida et al. | 701/213 |
| 2002/0083264 A1 * | 6/2002 | Coulson | 711/112 |
| 2003/0172261 A1 * | 9/2003 | Lee et al. | 713/1 |

FOREIGN PATENT DOCUMENTS

| | | |
|---|---|---|
| JP | 06-149480 | 11/1992 |
| JP | 6-231053 | 2/1993 |
| JP | 5-53732 A | 3/1993 |
| JP | 06-282380 | 3/1993 |
| JP | 7-28712 | 7/1993 |
| JP | 7-200418 | 12/1993 |
| JP | 8137622 A | 5/1996 |
| JP | 10-63551 | 8/1996 |
| JP | 10-154101 A | 6/1998 |
| JP | 2000-21073 | 7/1998 |
| JP | 2000-194607 | 12/1998 |
| JP | 2001-165682 | 12/1999 |
| JP | 2002-78233 | 8/2000 |
| JP | 2002-342147 | 5/2001 |
| JP | 2003-122609 | 4/2003 |

OTHER PUBLICATIONS

International Search Report dated Sep. 7, 2004.

Two (2) Office Actions from Japanese Patent Office both mailed Dec. 1, 2009, with English translations.

Two (2) Office Action from Japanese Patent Office both dated Dec. 1, 2009.

Office Action, from the Japanese Patent Office, issued in corresponding Japanese Patent Application No. 2010-157820, dated Dec. 6, 2011, pp. 1-3.

* cited by examiner

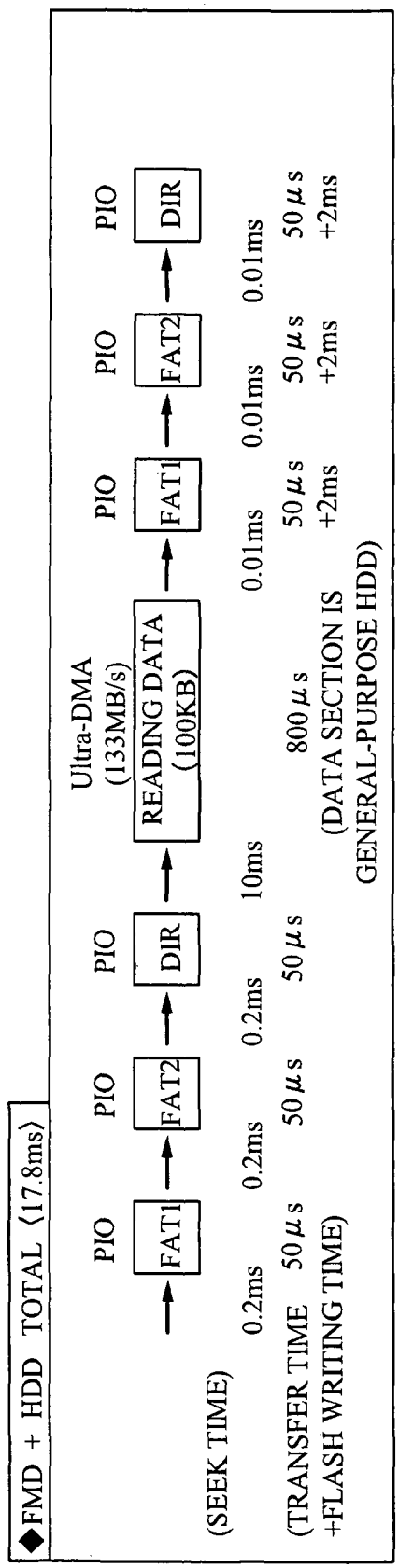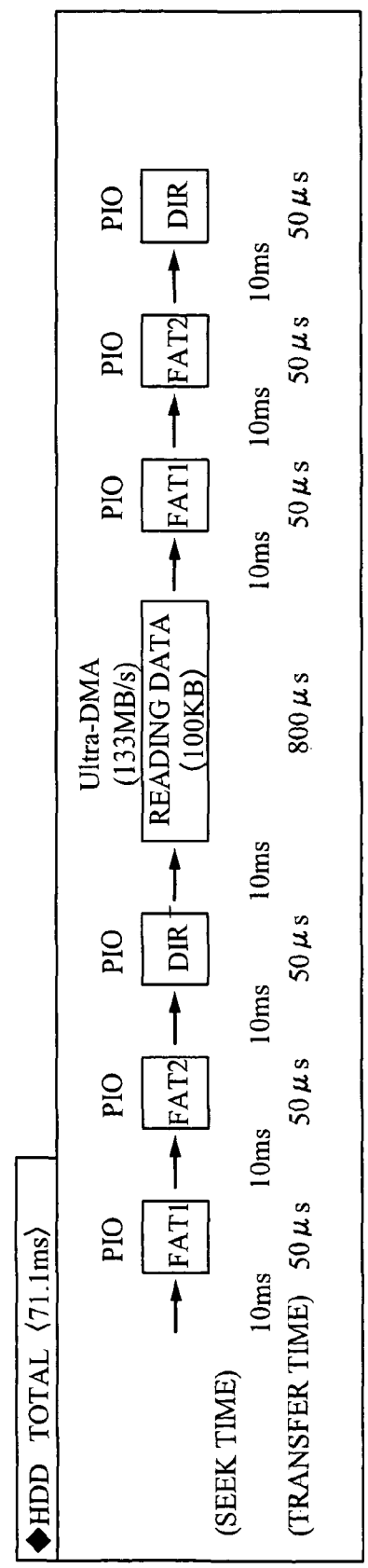

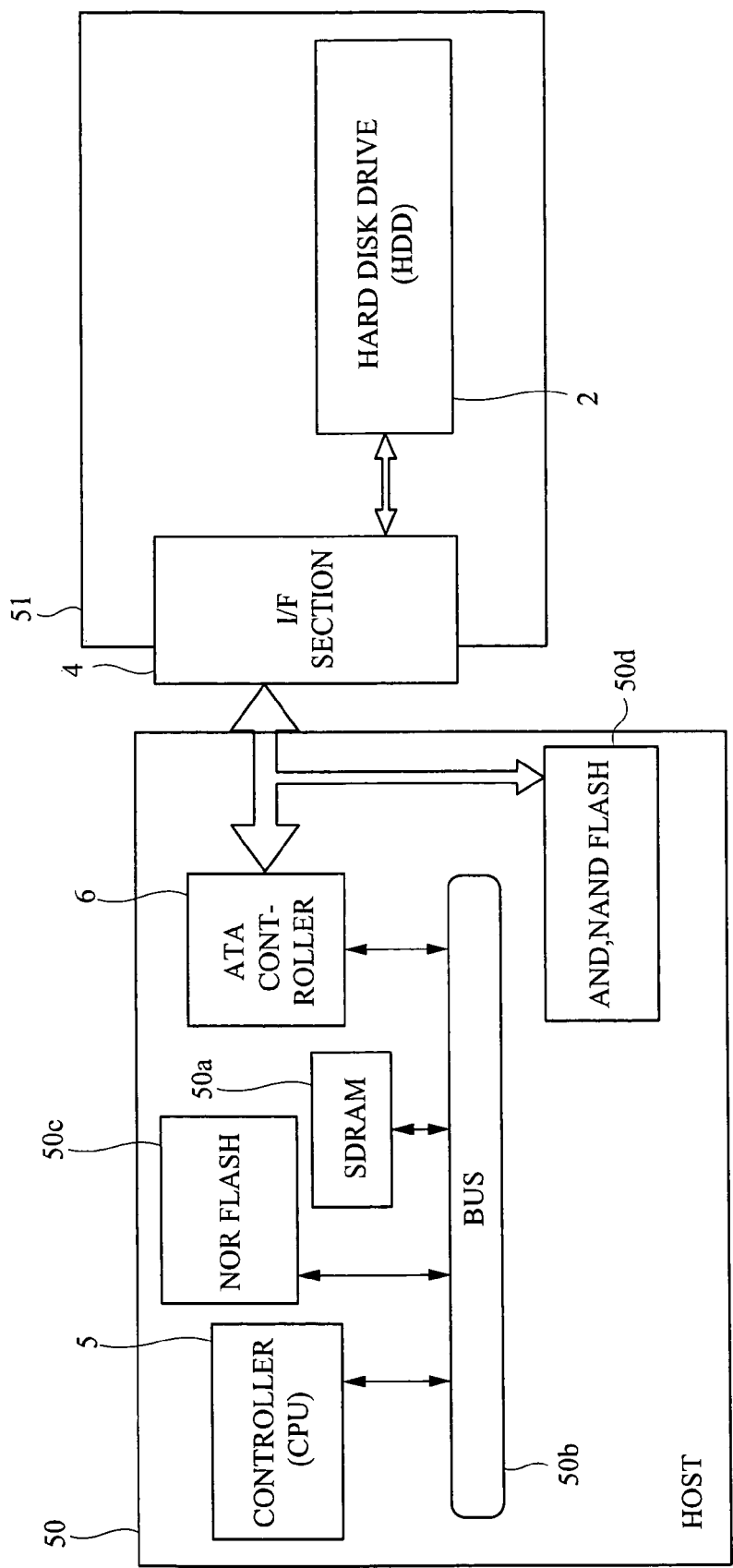

STORAGE DEVICE AND STORAGE SYSTEM HAVING A HARD DISK DRIVE AND FLASH MEMORY

TECHNICAL FIELD

The present invention relates to a storage device. More particularly, it relates to a technology which is effectively applied to a storage device and a storage system having a hard disk drive (HDD).

BACKGROUND ART

According to the examination by the inventors of the present invention, the following technology is known as the technology of a storage device.

For example, a hard disk drive (HDD) or the like is used as a storage device of a personal computer or the like. In recent years, the hard disk drive (HDD) is also used as a storage device of a car navigation system, a storage device of a television image such as an HDD recorder, and the like.

DISCLOSURE OF THE INVENTION

Incidentally, as a result of the examination by the inventors of the present invention about the technology of the storage device as mentioned above, the following matters have been found out.

For example, the hard disk drive (HDD) as mentioned above has been recently mounted on various household appliances owing to a reduction of its bit unit price. Further, along with the popularization of these appliances, a demand relating to a quality and reliability of the hard disk drive (HDD) has become more and more strong. However, the hard disk drive (HDD) is hard to secure high quality and reliability due to various factors such as a temperature, a vibration, a mechanical wear and the like.

On the other hand, as a device for a storage which can secure the high quality and reliability, a flash memory card and a flash memory drive (FMD) provided with the same interface standard as the hard disk drive (HDD) have been put into practical use. However, a bit unit price of the flash memory is higher in comparison with the hard disk, and the flash memory is not practical for an increase of capacity in view of a cost.

Incidentally, storage information stored in the hard disk drive (HDD) can be generally separated into system related information such as an operating system (O/S), an application and the like and a data related information such as an image, a voice and the like. When considering the quality and the reliability, a fatal problem does not generally occur even if some bit faults or the like are caused in the data related information, for example, the image, the voice and the like. On the other hand, a fatal problem may occur because an operation cannot be absolutely executed if even a small bit fault is caused in the system related information.

Further, for example, in a car navigation system using the hard disk drive (HDD), it is necessary to read map data or the like in the hard disk drive (HDD) in real time, and a high speed performance is required. Further, in recent years, music data such as a compact disc (CD) or the like is stored in the hard disk drive (HDD) and a navigation and a reproduction of the music data are simultaneously executed. Accordingly, the high speed performance is more and more required in the hard disk drive (HDD).

Accordingly, an object of the present invention is to provide a storage device and a storage system which can secure the high reliability at a practical cost.

Further, another object of the present invention is to provide a storage device and a storage system which are provided with a high speed performance at a practical cost.

The above and other objects and novel characteristics of the present invention will be apparent from the description of this specification and the accompanying drawings.

The typical ones of the inventions disclosed in this application will be briefly described as follows.

A storage device according to the present invention comprises: a first storage device which is a non-volatile storage device capable of inputting and outputting data with respect to a host and is provided with a first address space as seen from the host; a second storage device which is a non-volatile storage device capable of inputting and outputting data and has a lower data error rate than the first storage device; and control means for making the second storage device execute an instruction when the host issues the instruction to an address in the first address space and in the case where the address is included in a previously defined partial address space in the first address space.

In the configuration mentioned above, it is possible to distribute the data inputted and outputted to and from the host to the first storage device or the second storage device by discriminating the address inputted from the host.

In this case, it is preferable that a device which can execute a higher speed operation than the first storage device is used as the second storage device. Further, it is also preferable that the data stored in the second storage device is composed of, for example, the system region data including data relating to a file management such as a master boot record and a file management table and data such as an operating system (O/S) and an application. Accordingly, it is possible to achieve a storage device provided with high reliability and high speed performance.

Further, the data stored in the second storage device may be composed of only the date relating to the file management. In this case, the storage capacity of the second storage device equal to or less than 128 M bytes is sufficient, whereby it is possible to secure the high reliability and the high speed performance. Further, since it is possible to reduce the storage capacity of the second storage device which is comparatively expensive, it is possible to inhibit the cost increase. In addition, the first storage device is preferably designed to be detachable by using, for example, a slot or the like. By doing so, extension of the storage capacity can be facilitated.

Also, a storage device according to the present invention comprises: a first storage device which is a non-volatile storage device capable of inputting and outputting data with respect to a host and is provided with a first address space as seen from the host; a second storage device which is a non-volatile storage device capable of inputting and outputting data and has a lower data error rate than the first storage device; and second control means for extracting a partial data from the data corresponding to the first address space and storing the extracted partial data in the second storage device. In such a configuration, the data for which the reliability is required can be stored in the second storage device.

Further, the extracted partial data is composed of, for example, the data of the system region, the code data for detecting and correcting an error and the like. Accordingly, it is possible to improve the reliability. In this case, the hard disk drive (HDD) can be exemplified as the first storage device described above. Further, a non-volatile memory which can be accessed by a sector unit of 512 bytes or a cluster unit of 2048 bytes, for example, a flash memory drive (FMD) can be exemplified as the second storage device.

Also, a storage system according to the present invention comprises: a host and a storage device. In the storage system, the host comprises: a ROM in which a processing program is stored; a CPU and a RAM for executing the processing program; and a controller which controls an input and output of data between the host and the storage device, and the storage device comprises: a first storage device which is a non-volatile storage device; a second storage device which is a non-volatile storage device and has a lower data error rate than the first storage device; and a drive setting terminal by which the host discriminates the first storage device and the second storage device. In this configuration, the processing program stored in the ROM has a function to allocate a partial address space included in address spaces of the storage device, to which continuous addresses are allocated, to the second storage device, and to allocate the other address spaces to the first storage device.

More specifically, in this configuration, the function similar to the first control means mentioned in the storage device according to the present invention is achieved by the processing program of the host. Accordingly, the storage system according to the present invention is provided with the advantages of the high reliability and the high speed performance similar to the storage device according to the present invention mentioned above, and since it uses the processing program, the storage system is effective particularly in view of a cost in comparison with the configuration provided with the first control means.

In accordance with the matters mentioned above, the storage device and the storage system according to the present invention are particularly advantageously when applied to a car navigation system or the like which requires the high reliability and the high speed performance and is used under an environment having a lot of physical vibrations or the like.

BRIEF DESCRIPTION OF THE DRAWINGS

FIG. 12 shows explanatory views of an example of an effect obtained by storing a file management table and the like in a non-volatile memory drive in the storage system according to the fifth embodiment of the present invention, in which FIG. 12A shows a writing time in the case of storing them in the non-volatile memory drive and FIG. 12B shows a writing time in the case of storing them in the hard disk drive.

FIG. 13 is a schematic view showing an example of a configuration of a storage system according to a sixth embodiment of the present invention.

FIG. 14 shows perspective views of an example of an outer shape of a storage device according to a seventh embodiment of the present invention, in which

BEST MODE FOR CARRYING OUT THE INVENTION

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

Figure 1:
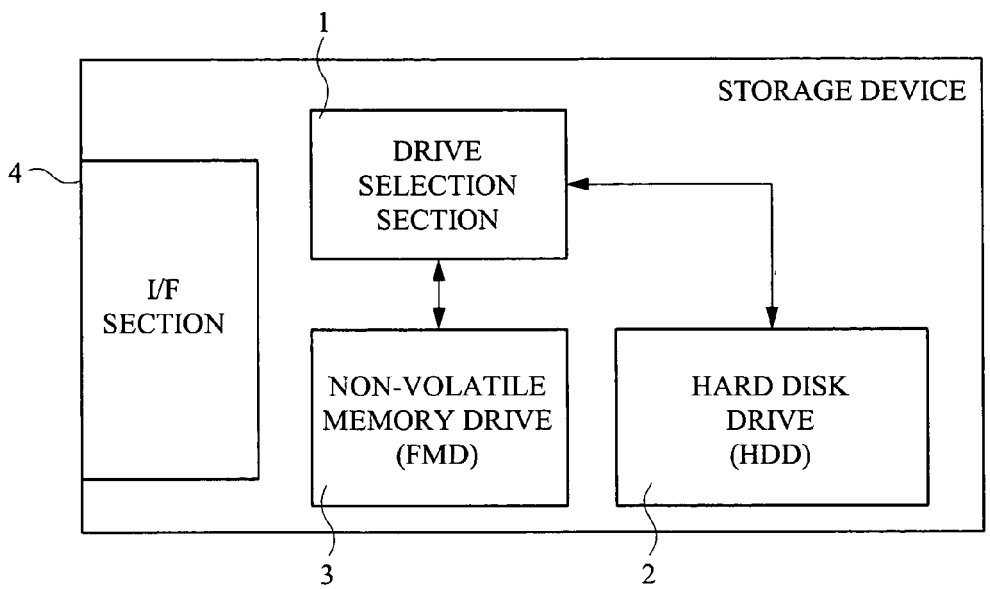
FIG. 1 is a schematic view showing an example of a configuration of a storage device according to a first embodiment of the present invention.
Figure 2:
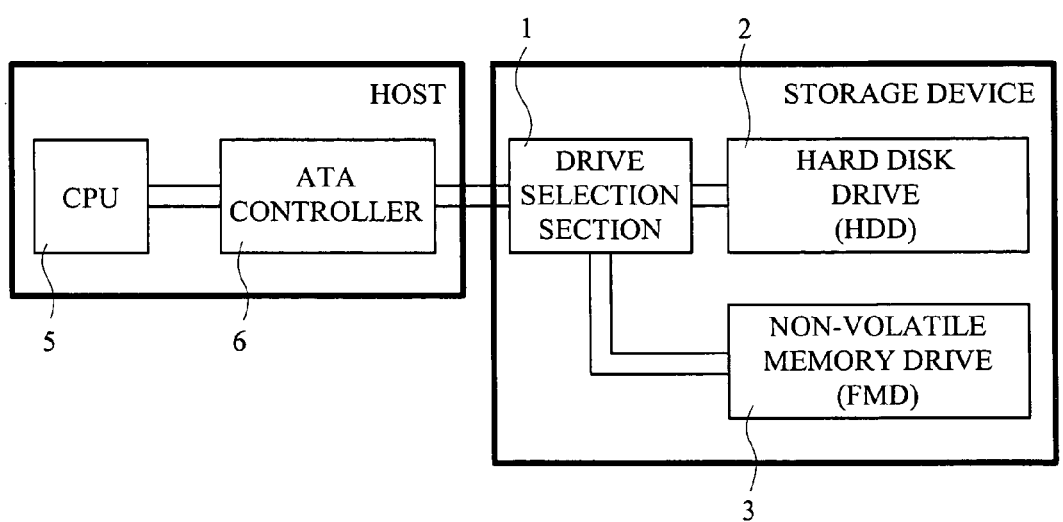
FIG. 2 is a block diagram showing an example of a system in which a host is connected to the storage device shown in FIG. 1 in the storage device according to the first embodiment of the present invention.

FIG. 1 is a schematic view showing an example of a configuration of a storage device according to a first embodiment of the present invention. Further, FIG. 2 is a block diagram showing an example of a system in which a host is connected to the storage device shown in FIG. 1, in the storage device according to the first embodiment of the present invention.

The storage device shown in FIG. 1 is comprised of a drive selection section 1, a hard disk drive (HDD) (first storage device) 2, a non-volatile memory drive (second storage device) 3 such as a flash memory drive (FMD), an interface (I/F) section 4 and the like. Further, in FIG. 2, a host including, for example, a CPU 5 and an AT attachment (ATA) controller 6 is connected to the interface section 4 of the storage device.

The hard disk drive (HDD) 2 has a magnetic storage medium, a controller for the magnetic storage medium and the like therein, and a control scheme thereof is executed on the basis of an ATA standard which is an interface standard. The non-volatile memory drive 3 has, for example, a flash memory, a controller for the flash memory and the like therein, and a control scheme thereof is also executed on the basis of the ATA standard. The ATA controller 6 converts input and output signals of the CPU 5 into the ATA standard, and executes an input and an output to the storage device.

In this case, the flash memory drive (FMD) mentioned as an example of the non-volatile memory drive 3 includes a NAND flash product and an AND flash product therein, and can be accessed by a sector unit of 512 bytes or a cluster unit of 2048 bytes. The flash memory drive (FMD) has a lower data error rate in comparison with the hard disk drive (HDD) 2 and can execute a high speed operation. Further, the difference in the error rate becomes further significant under an environment in which physical impact and vibration exist, for example, in a car navigation system.

An address space for executing a detection is previously defined in the drive selection section (first control means) 1, and the drive selection section 1 has a function to make the non-volatile memory drive 3 execute an instruction in place of the hard disk drive 2 if an address value at the time of receiving the instruction to the hard disk drive (HDD) 2 from the CPU 5 via the ATA controller 6 is included in the predefined address space.

In other words, for example, in the case where information of the number of sectors executing a transfer and a transfer start address (for example, a cylinder number, a sector number and the like) is inputted from the ATA controller 6 and a read or write command or the like is inputted thereafter, the drive selection section 1 recognizes the transfer start address and makes any one of the non-volatile memory drive 3 and the hard disk drive (HDD) 2 execute the read or write operation on the basis of whether or not the start address is included in the predefined address space.

Note that the address space defined by the drive selection section 1 is determined on the basis of the address configuration of the system used by a user. The defining means may be a fixed one such as formed by a circuit or a variable one such as formed by a setting by a register, a switch or the like. Next, an example of the predefined address space will be described on the basis of an example in which the address configuration of the system used by the user is as shown in FIG. 3.

Figure 3:
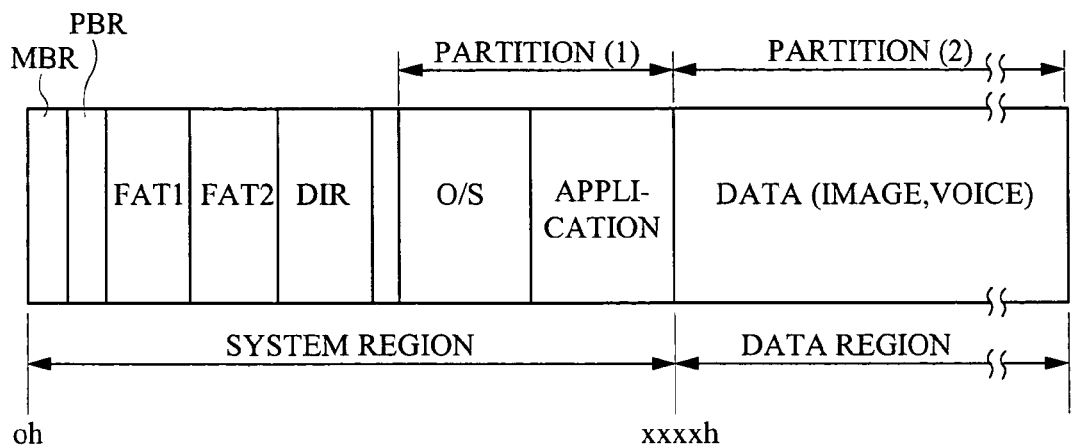
FIG. 3 is an explanatory view showing an example of an address configuration of a system used at the time when determining an address space previously defined by a drive selection section in the storage device according to the first embodiment of the present invention.

FIG. 3 is an explanatory view showing an example of an address configuration of a system used at the time of determining the address space previously defined by the drive selection section, in the storage device according to the first embodiment of the present invention. FIG. 3 shows an example of an address space (first address space) which is allocated to the hard disk drive (HDD) 2 by the host, in which a system region and a data region are allocated toward an upper level from a lowest level address 0h within the address space.

The system region includes data relating to a file management such as a master boot record (MBR), a partition boot record (PBR), a file management table (FAT1 and FAT2), directory information (DIR) and the like, and data such as an operating system (O/S) and an application in a partition (1). The data region includes data such as an image and a voice in a partition (2). Further, an address value which separates the system region and the data region is set to "xxxx h".

In the case mentioned above, the system region generally corresponds to a region in which even a bit fault cannot be permitted, and the data region corresponds to a region in which some bit fault can be permitted. Accordingly, the value of "xxxx h" is defined in the drive selection section 1. Further, in the case where the address value inputted from the ATA controller 6 is included in the space of "0h-xxxx h", the drive selection section 1 actuates the non-volatile memory, drive 3, and otherwise, it actuates the hard disk drive (HDD) 2.

Accordingly, although the host accesses the hard disk drive (HDD) 2 as normal, the address space of the system region can be automatically allocated to the non-volatile memory drive 3 by the storage device. Therefore, it is possible to improve a reliability of the date and a reliability of an entire user system.

Further, in general, a file capacity of the system region is smaller in comparison with the data region. Accordingly, it is sufficient that the non-volatile memory drive 3 is provided with a capacity of, for example, about some hundreds mega bytes. Therefore, it is possible to inhibit an increase of a cost.

As mentioned above, in the storage device according to the first embodiment of the present invention, it is possible to achieve the storage device which can secure the high reliability at a practical cost.

Second Embodiment

Figure 4:
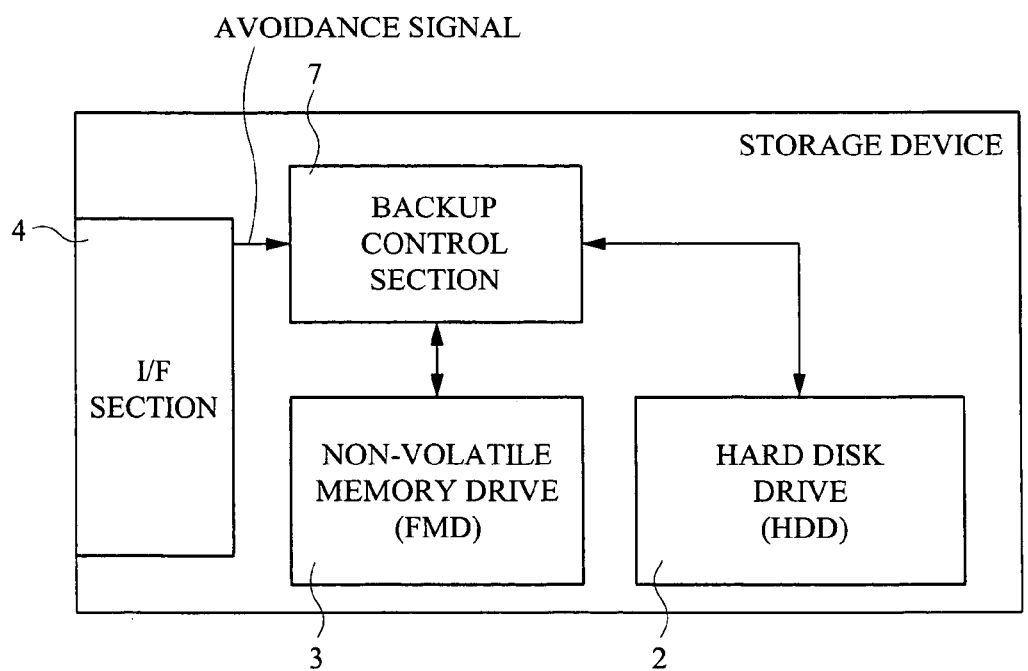
FIG. 4 is a schematic view showing an example of a configuration of a storage device according to a second embodiment of the present invention.

FIG. 4 is a schematic view showing an example of a configuration of a storage device according to a second embodiment of the present invention. The storage device shown in FIG. 4 is comprised of, for example, a backup control section 7, the hard disk drive (HDD) 2, the non-volatile memory drive 3, for example, the flash memory drive (FMD) or the like, the interface section 4 and the like.

Since the configuration other than the backup control section 7 is the same as FIG. 1, the description thereof will be omitted. The backup control section (second control means) 7 has an avoidance signal corresponding to an input signal, and has a function to extract a partial data in the hard disk drive (HDD) 2 in the case where the avoidance signal is inputted and to transfer the extracted data to the non-volatile memory drive 3. Further, on the contrary, it also has a function to transfer the date stored in the non-volatile memory drive 3 to the hard disk drive (HDD) 2. Note that the data transferred at this time corresponds to the date in the system region mentioned above.

Figure 5:
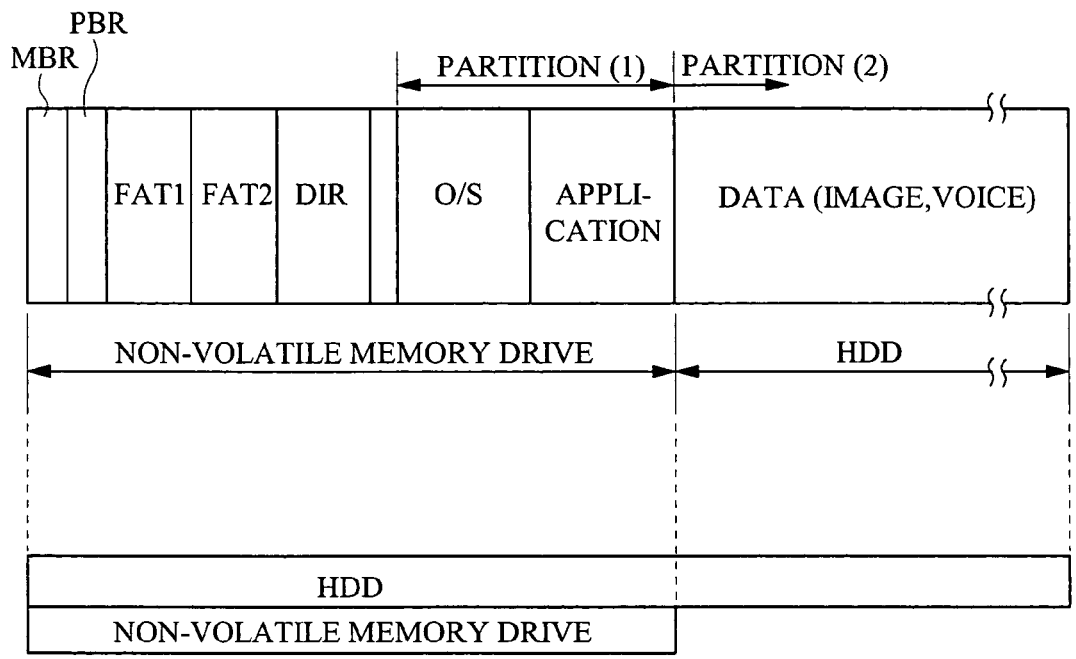
FIG. 5 is an explanatory view showing an example of a relation between the data stored in a hard disk drive (HDD) and the data stored in a non-volatile memory drive in the storage device according to the second embodiment of the present invention.

In other words, a relation between the data which are respectively stored in the hard disk drive (HDD) 2 and the non-volatile memory drive 3 is, for example, as shown in FIG. 5. FIG. 5 is an explanatory view showing an example of the relation between the data stored in the hard disk drive (HDD) and the data stored the non-volatile memory drive, in the storage device according to the second embodiment of the present invention. As shown in FIG. 5, the system region is redundantly stored in the hard disk drive (HDD) 2 and the non-volatile memory drive 3, and the data region is stored only in the hard disk drive (HDD) 2.

Further, the avoidance signal is inputted according to need by the host shown in FIG. 2 or the like. For example, the host issues the avoidance signal once a day or at a time of turning off the power of the system. By means of these functions, it is possible to restore the data in the system region of the hard disk drive (HDD) 2 with reference to the non-volatile memory drive 3 even when the data error occurs in the data in the system region in the hard disk drive (HDD) 2. Further, similar to the first embodiment mentioned above, it is possible to inhibit the cost increase of the non-volatile memory drive 3 by storing only the data of the system region in the non-volatile memory device 3.

As mentioned above, in the storage device according to the second embodiment of the present invention, it is possible to achieve the storage device which can secure a high reliability at a practical cost.

Third Embodiment

Figure 6:
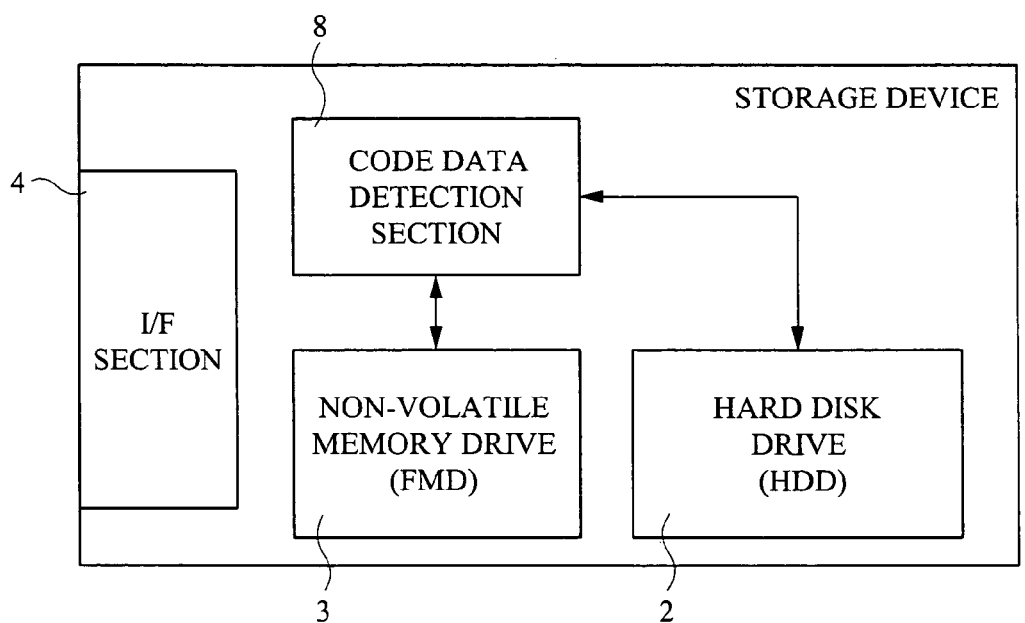
FIG. 6 is a schematic view showing an example of a configuration of a storage device according to a third embodiment of the present invention.

FIG. 6 is a schematic view showing an example of a configuration of a storage device according to a third embodiment of the present invention. The storage device shown in FIG. 6 is comprised of, for example, a code data detection section 8, the hard disk drive (HDD) 2, the non-volatile memory drive 3, for example, the flash memory drive (FMD) or the like, the interface section 4 and the like.

Since the configuration other than the code data detection section 8 is the same as FIG. 1, the description thereof will be omitted. For example, when the host is connected to the interface section 4 as shown in FIG. 2 and the data including an error detection and a correction code such as an error correcting code (ECC) is inputted to the hard disk drive (HDD) 2 from the host, the code date detection section (second control means) 8 extracts only the code data part and stores the data in the non-volatile memory drive 3.

Further, when a data output instruction is issued to the hard disk drive (HDD) 2 from the host, the code data detection section outputs the data in the hard disk drive (HDD) 2 and the code data stored in the non-volatile memory drive 3 and corresponding to the data to the host. By means of these functions, it is possible to improve a reliability of the data corresponding to an entire address space (first address space) in the hard disk drive (HDD) 2.

Figure 7:
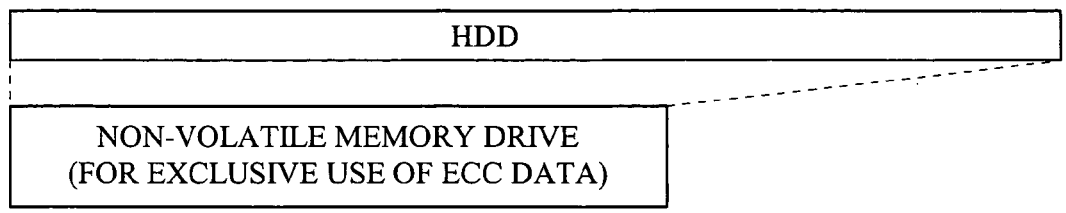
FIG. 7 is an explanatory view showing an example of a relation between the capacity of a hard disk drive (HDD) and the capacity of a non-volatile memory drive in the storage device according to the third embodiment of the present invention.

Note that, with respect to the capacity of the hard disk drive (HDD) 2 and the capacity of the non-volatile memory drive 3, it is possible to sufficiently reduce the capacity of the non-volatile memory drive 3 as shown in FIG. 7. FIG. 7 is an explanatory view showing a relation of the capacity between the hard disk drive (HDD) and the non-volatile memory drive in the storage device according to the third embodiment of the present invention. In FIG. 7, for example, in the case where the capacity of the hard disk drive (HDD) 2 is set to 10 G bytes and the ECC data is stored in the non-volatile memory drive 3, about 156 M bytes of the capacity of the non-volatile memory drive 3 is sufficient. Accordingly, it is possible to inhibit the cost increase of the non-volatile memory drive 3.

As mentioned above, in the storage device according to the third embodiment of the present invention, it is possible to achieve the storage device which can secure the high reliability at a practical cost.

Fourth Embodiment

Figure 8:
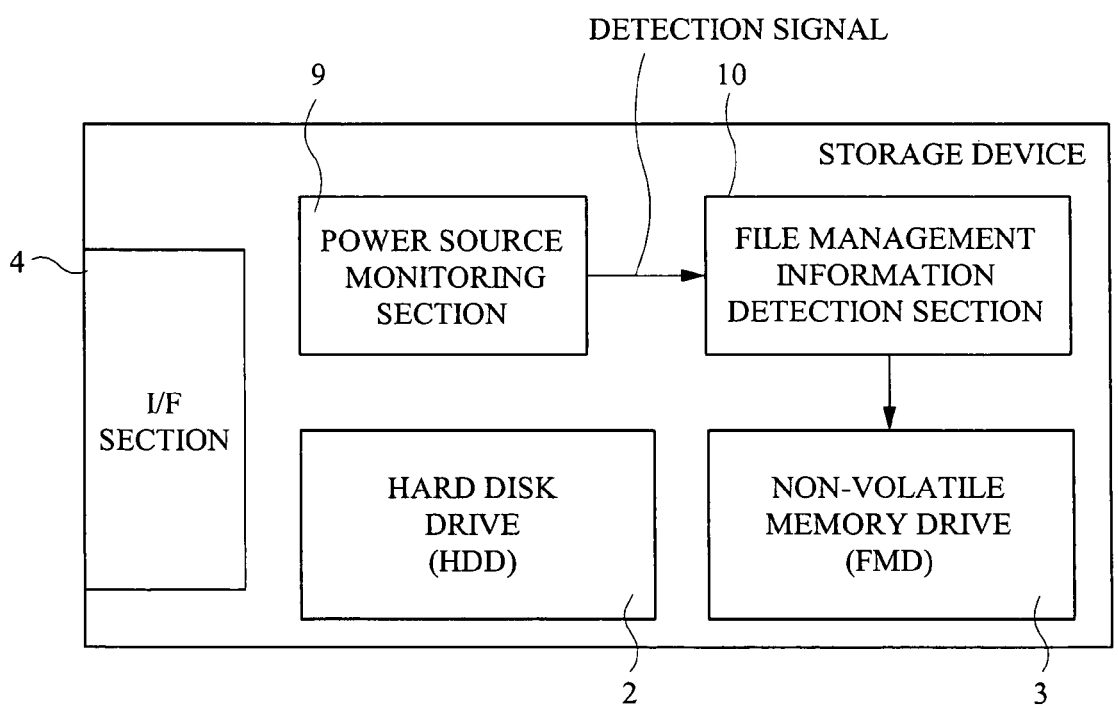
FIG. 8 is a schematic view showing an example of a configuration of a storage device according to a fourth embodiment of the present invention.

FIG. 8 is a schematic view showing an example of a configuration of a storage device according to a fourth embodiment of the present invention. The storage device shown in FIG. 8 is comprised of, for example, a power source monitoring section 9, a file management information detection section 10, the hard disk drive (HDD) 2, the non-volatile memory drive 3, for example, the flash memory drive (FMD) or the like, the interface section 4 and the like.

Figure 9:
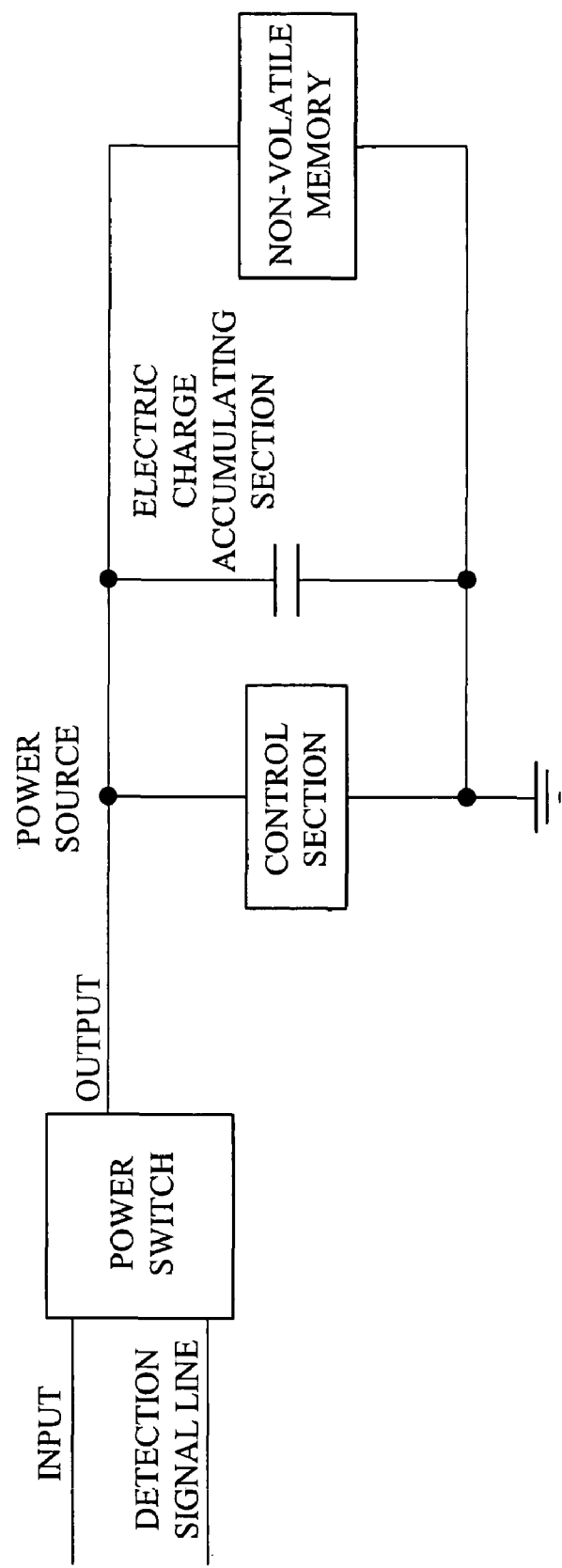
FIG. 9 is a schematic view showing an example of a configuration of a power source monitoring circuit in the storage device according to the fourth embodiment of the present invention.

Since the configuration other than the power source monitoring section 9 and the file management information detection section 10 is the same as FIG. 1, the description thereof will be omitted. For example, the power source monitoring section 9 is mounted with a comparator, a condenser, a booster circuit and the like therein, and it has a function to disconnect a power source and output a detection signal by a power source monitoring circuit as shown in FIG. 9, and maintain a power source voltage for a predetermined time by using an electric charge accumulated in the condenser at the time when a sudden power-off such as a blackout or the like occurs.

The file management information detection section 10 (second control means) has a function to detect the file management information (for example, FAT1 and FAT2, DIR and the like in FIG. 3) inputted from the host connected to the interface section 4, and temporarily retain the information. Further, the file management information detection section 10 has a function to store the temporarily retained information in the non-volatile memory drive 3 by utilizing the power source voltage maintained for a predetermined time, at the time when receiving the detection signal from the power source monitoring section 9.

In the hard disk drive (HDD) 2, it is likely that the file management information is broken at the time when the sudden power-off or the like occurs during the writing of the file management information. Accordingly, there is the possibility that the operation to the hard disk drive (HDD) 2 is absolutely impossible, and a system failure or the like occurs. The system failure like that can be prevented to some degree even in the case of a sudden power-off, by securely keeping the file management information in the non-volatile memory drive 3. In other words, it is possible to improve a reliability of the system.

Fifth Embodiment

Figure 10:
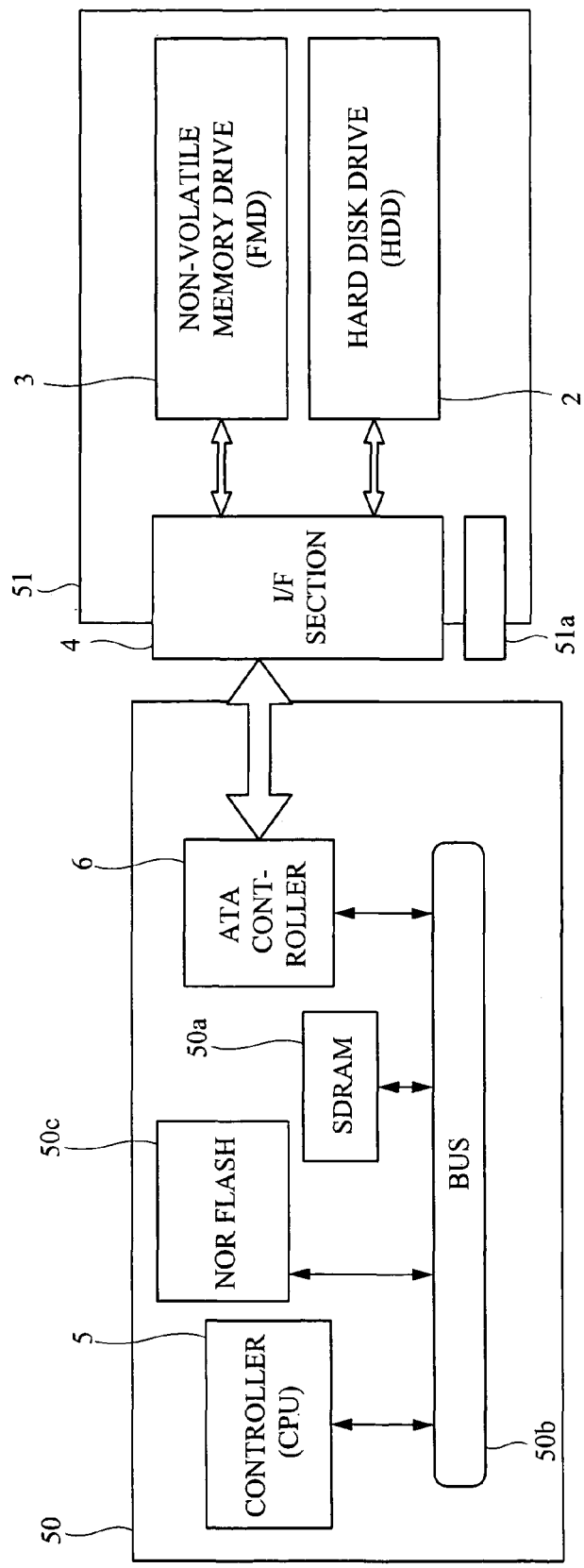
FIG. 10 is a schematic view showing an example of a configuration of a storage system according to a fifth embodiment of the present invention.

FIG. 10 is a schematic view showing an example of a configuration of a storage system according to a fifth embodiment of the present invention. In the configuration of the storage system shown in FIG. 10, when compared with the storage device shown in FIG. 1 and FIG. 2, the same function as the drive selection section 1 is provided in the host side and a drive setting terminal is added in the storage device.

More specifically, the storage system shown in FIG. 10 is comprised of a host 50 and a storage device 51, in which the host 50 has, for example, a CPU 5, a RAM 50$a$ such as an SDRAM, an ATA controller 6, a bus 50$b$, a ROM 50$c$ in which a program (address management program) provided with the same function as the drive selection section 1 and the like, and the storage device 51 has, for example, the hard disk drive (HDD) 2, the non-volatile memory drive 3 such as the flash memory drive (FMD) or the like, the interface section 4, a drive setting terminal 51$a$ and the like. Note that the ROM 50$c$ is, for example, a NOR type flash memory, and it can be accessed by a byte unit or a word unit with respect to the CPU 5.

The drive setting terminal 51$a$ is a terminal which sets any one of the hard disk drive (HDD) 2 and the non-volatile memory drive 3 to a master and sets the other to a slave so that the host 50 can recognize each of the drives. The address management program is achieved by, for example, a device driver and has a function to allocate a partial address space such as a space having a certain address value or less in the address space of the storage device 51, to which continuous addresses are allocated, to the non-volatile memory drive 3 and allocate the other partial address space such as a space having a value more than the certain address value to the hard disk drive (HDD) 2. Further, the address management program recognizes a correspondence between the allocated address spaces and respective physical addresses of the non-volatile memory drive 3 and the hard disk drive (HDD) 2, and it functions so that the physical address is inputted to the I/F section 4 at the time when the instruction is issued to the storage device 51.

Figure 11:
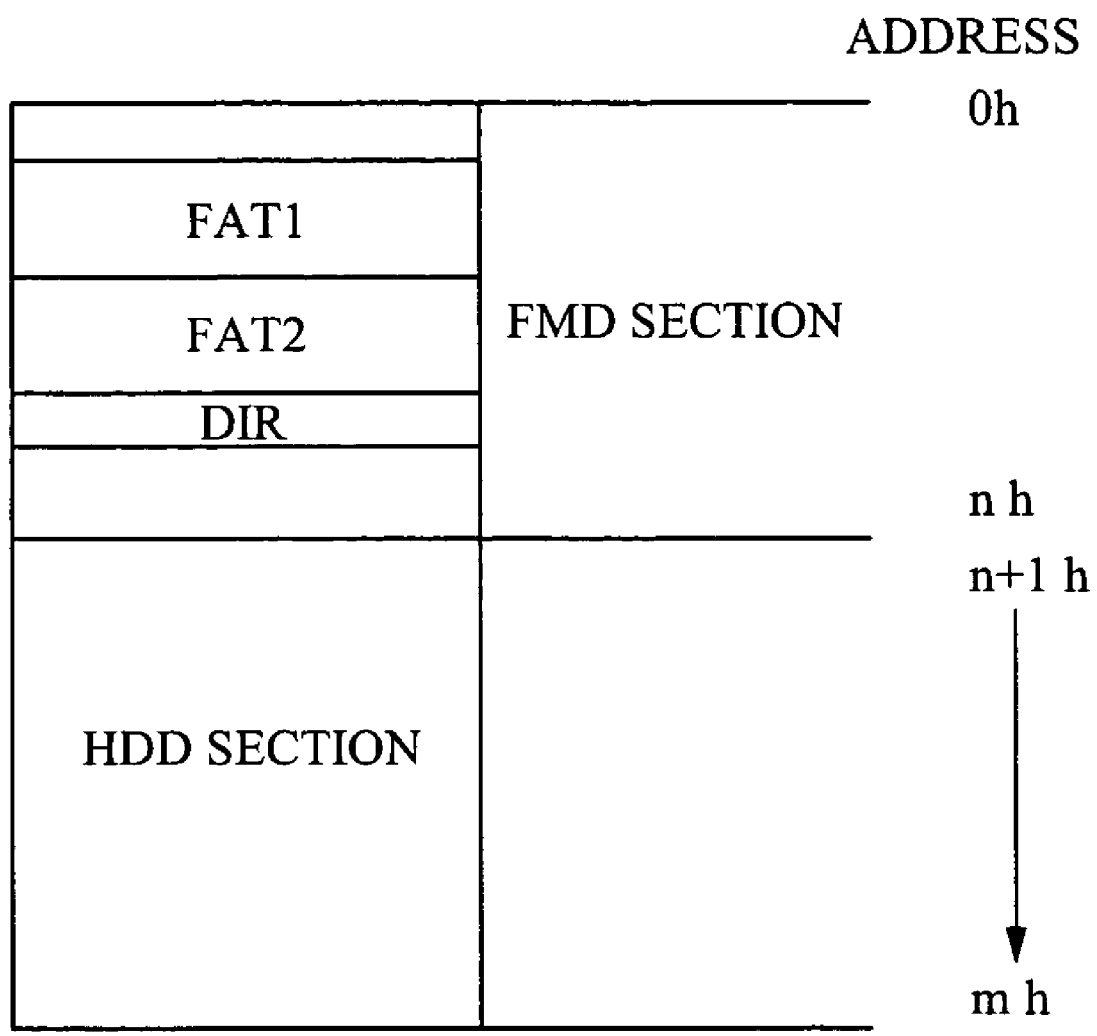
FIG. 11 is an explanatory view showing an example of an address space of a storage device in FIG. 10 and contents stored in the address space in the storage system according to the fifth embodiment of the present invention.

Incidentally, the contents stored in the non-volatile memory drive 3 are those in the system region as described in FIG. 3. In particular, a high speed operation can be achieved when the file management table (FAT1 and FAT2) and the directory information (DIR) are stored as shown in FIG. 11. Note that this effect can be obtained also in the storage device according to the first embodiment mentioned above. This will be described below.

FIG. 11 is an explanatory view showing an example of the address space of the storage device in FIG. 10 and the contents stored in the address space, in a storage system according to the fifth embodiment of the present invention. In FIG. 11, of the continuous address spaces, "0h" to "nh" are allocated to the flash memory drive (FMD) and "n+1h" to "mh" are allocated to the hard disk drive (HDD) 2. Further, the file management table (FAT1 and FAT2) and the directory information (DIR) are stored in the flash memory drive (FMD).

In the file management table (FAT1 and FAT2), for example, a relation between a sector to be a minimum storage unit of the flash memory drive (FMD) and the hard disk drive (HDD) 2 and a cluster to be a minimum management unit of the O/S or the like and composed of a plurality of sectors is stored. Further, in the directory information (DIR), for example, information such as a file name, an extension, a size, an updating time of day, a head cluster number and the like is stored. Accordingly, when the O/S executes read/write of the data for the storage device 51, the file management table (FAT1 and FAT2) and the directory information (DIR) are sequentially referred.

However, in the case where the file management table (FAT1 and FAT2) and the like are stored in the hard disk drive (HDD) 2, the operation speed is lowered due to a seek time and a search time. The problem mentioned above can be solved by storing the file management table (FAT1 and FAT2) and the like in the flash memory drive (FMD), and it is possible to achieve the high speed operation as shown in FIG. 12.

FIG. 12 shows explanatory views of an example of an effect obtained by storing the file management table or the like in the non-volatile memory drive, in the storage system according to the fifth embodiment of the present invention, in which FIG. 12A shows a writing time in the case of storing it in the non-volatile memory drive, and FIG. 12B shows a writing time in the case of storing it in the hard disk drive. In FIG. 12A and FIG. 12B, data of 100 k bytes is written to the hard disk drive (HDD) 2 from the RAM 50a by using an ultra direct memory access (Ultra-DMA) transfer of 133 M bytes/second, and a program I/O (PIO) transfer is performed between the CPU 5 and the hard disk drive (HDD) 2 before and after the writing.

In FIG. 12B, the file management table (FAT1 and FAT2) and the directory information (DIR) exist in the hard disk drive (HDD) 2, and it takes about 10 ms to perform the PIO transfer of the information. Accordingly, the writing time of 100 k bytes is about 71.1 ms. On the other hand, in FIG. 12A, the file management table (FAT1 and FAT2) and the directory information (DIR) exist in the flash memory drive (FMD), and it takes about 0.01 ms to 0.2 ms to perform the PIO transfer of the information. Accordingly, the writing time of 100 k bytes is about 17.8 ms, and the speed up by about 4 times can be achieved in comparison with FIG. 12B.

Note that it is considered that the same effect can be obtained also at the time of reading, and the speed up by about 3 to 4 times can be expected. Further, since the access to the hard disk drive (HDD) 2 is particularly concentrated at the time of turning on the power and turning off the power, the speed-up effect is more significant, and it is possible to greatly shorten the starting time of the O/S.

As mentioned above, the speed up can be achieved by storing the file management table (FAT1 and FAT2) and the directory information (DIR) in the non-volatile memory drive 3. Further, it is possible to obtain a high reliability by storing the master boot record (MBR), the partition boot record (PBR) and the like in FIG. 3 in addition thereto. Further, it is considered that 128 M bytes or less is sufficient for the data capacity relating to the file management for the file management table (FAT1 and FAT2), the directory information (DIR), the master boot record (MBR) and the partition boot record (PBR). Accordingly, also in the case where the O/S and the application are not included in the non-volatile memory drive 3 and only the data relating to the file management is stored therein, it is possible to achieve the high reliability and the speed up. Further, since the capacity can be reduced, it is possible to inhibit a cost increase.

Further, since the storage system in FIG. 10 does not require hardware such as the drive selection section 1 in FIG. 1 in comparison with the configuration provided with the storage device of FIG. 1 as shown in FIG. 2, it is said that it can be easily realized particularly in view of a cost.

Sixth Embodiment

FIG. 13 is a schematic view showing an example of a configuration of a storage system according to a sixth embodiment of the present invention. The storage system shown in FIG. 13 corresponds to an example in which a non-volatile memory device 50d capable of performing the access by a sector unit such as an AND flash memory or a NAND flash memory is provided on the host 50, without providing the non-volatile memory drive 3 on the storage device 51, in comparison with the storage system in FIG. 10. Further, the storage system in FIG. 13 is not provided with the drive setting terminal 51a in FIG. 10 because the drive setting terminal 51a is not particularly necessary.

In the configuration in FIG. 13, as described in the fifth embodiment, it is possible to obtain a configuration which is particularly effective in the case where only the data relating to the file management is stored in the non-volatile memory drive 3. In other words, since a necessary storage capacity can be reduced, the storage capacity can be acquired by mounting the non-volatile memory device 51a on the host 50 without using the flash memory drive (FMD). Accordingly, a space can be saved and a widely used device can be employed as the storage device 51.

Seventh Embodiment

Figure 14A:
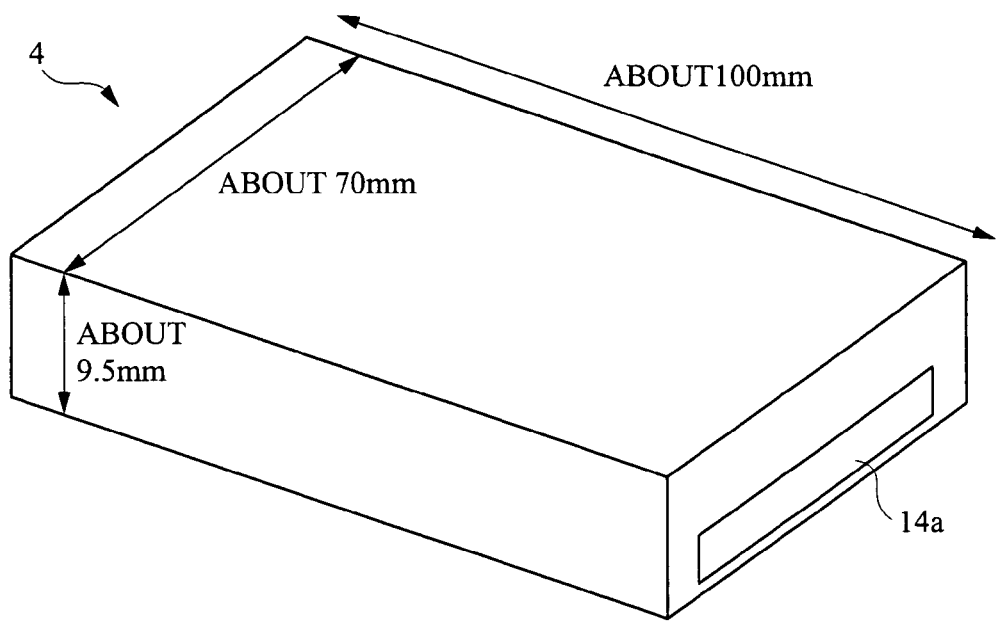
FIG. 14A shows the storage device seen from a front surface side and FIG. 14B shows the storage device seen from a rear surface side.
Figure 14B:
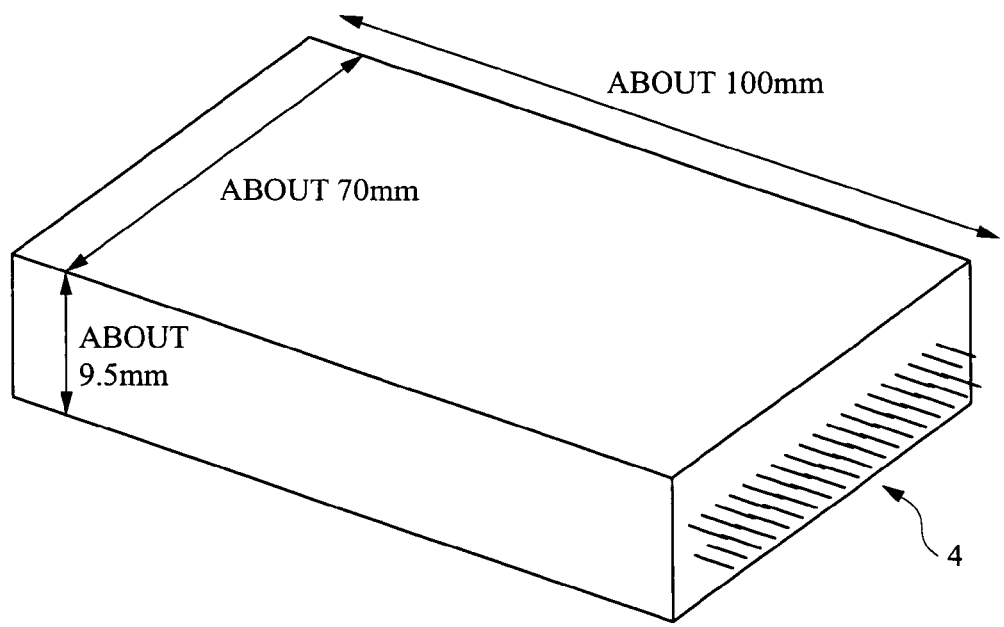
Figure 15:
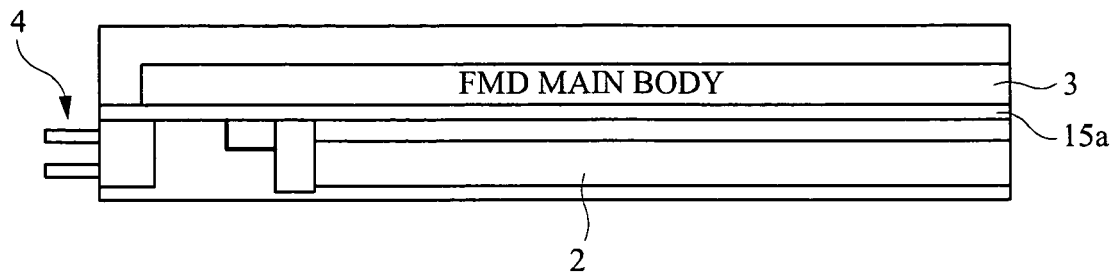
FIG. 15 is a cross-sectional view showing an example of an internal configuration of the storage device in FIG. 14 in the storage device according to the seventh embodiment of the present invention.

FIG. 14 shows perspective views of an example of an outer shape of a storage device according to a seventh embodiment of the present invention, in which FIG. 14A shows the storage device seen from a front surface side and FIG. 14B shows the storage device seen from a rear surface side. FIG. 15 is a cross-sectional view showing an example of an internal configuration of the storage device in FIG. 14 in the storage device according to the seventh embodiment of the present invention. The storage device shown in FIG. 14 and FIG. 15 corresponds to, for example, a part of the storage device 51 shown in FIG. 10. The size thereof is, for example, about 100 mm×70 mm×9.5 mm which is approximately the same size as that of a generally known 2.5 inch hard disk drive. Accordingly, it is possible to apply the storage device in FIG. 14 to an installation space of the storage device in the widely used storage system.

Further, the front surface side of the outer shape thereof has a slot 14a for inserting the hard disk drive (HDD) 2 as shown in FIG. 14A, and the rear surface side thereof has, for example, a connector for an integrated drive electronics (IDE) interface as the I/F section 4. Further, in this internal configuration, as shown in FIG. 15, the flash memory drive (FMD) is provided in an upper portion of a substrate 15a, and the hard disk drive (HDD) 2 of 2.5 inch size is provided in a lower portion.

Further, a wiring of the hard disk drive (HDD) 2 and the flash memory drive (FMD) is connected to the I/F section 4 via the substrate 15a. In this case, although the storage device 51 shown in FIG. 10 is exemplified, the same configuration is also applied to the other storage devices mentioned in the above embodiments. For example, in the case of the storage device in FIG. 1, the drive selection section 1 is mounted on the substrate 15a.

The hard disk drive (HDD) 2 can be detached through the slot 14a. Accordingly, in the case where an extension of the storage capacity becomes necessary, the extension can be achieved by replacing the hard disk drive (HDD) 2. Further, even in the case where an external input does not exist such as a CD-ROM in a built-in equipment or the like, it is possible to easily achieve the addition of an application and a version up thereof by detaching the hard disk drive (HDD) 2. Further, the storage device in FIG. 14 can be used as a removable storage in which a recording media is replaceable. At this time, since the detached recording media does not include data relating to the file management such as the file management table (FAT1 and FAT2), it is not easy to decode the contents, and the data confidentiality is provided.

Note that, in FIG. 14 and FIG. 15, the flash memory drive (FMD) cannot be detached for keeping the confidentiality and in view of a possibility of failure due to a repeated insertion and detachment. However, if these matters do not come into question particularly, the configuration provided with a slot for the flash memory drive (FMD) is also possible.

Eighth Embodiment

Figure 16:
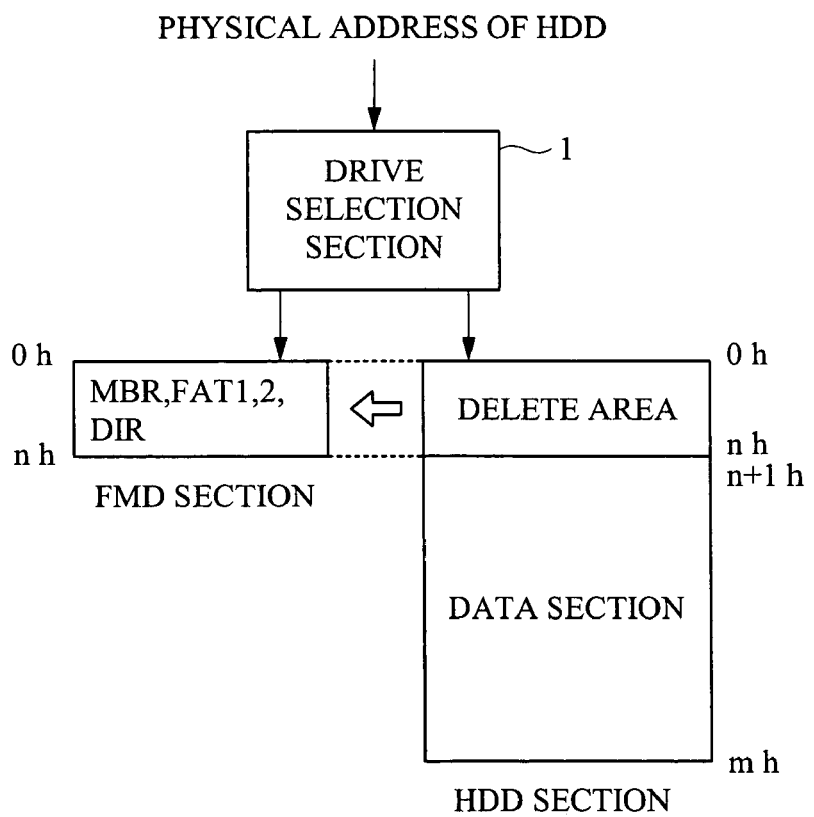
FIG. 16 is a schematic view showing an example of an address configuration different from that of FIG. 11 in a storage device according to an eighth embodiment of the present invention.

FIG. 16 is a schematic view showing an example of an address configuration which is different from FIG. 11 in a storage device according to an eighth embodiment of the present invention. In FIG. 16, an address space of the flash memory drive (FMD), an address space of the hard disk drive (HDD) 2 and the drive selection section 1 shown in FIG. 1 are shown. Further, the data in the hard disk drive (HDD) 2, for example, the data relating to the file management (MBR, FAT1 and 2, DIR and the like) is stored in the flash memory drive (FMD).

The address spaces as mentioned above are created in the following manner. First, a format is executed to the hard disk drive (HDD) 2 to create a region of the data relating to the file management in the hard disk drive (HDD) 2. Thereafter, the application or the like is installed in the hard disk drive (HDD) 2 for the built-in equipment use or the like. Next, the region of the data relating to the file management is copied to the flash memory drive (FMD). Then, the region of the data relating to the file management in the hard disk drive (HDD) is deleted.

In this case, the case where an instruction for a certain physical address is inputted to the hard disk drive (HDD) 2 from the host with respect to the address space created as mentioned above is assumed. In such a case, if the address space is between "0h" and "nh", the drive selection section 1 transmits the physical address and the instruction to the FMD section, and if the address space is between "n+1h" and "mh", the drive selection section 1 transmits the physical address and the instruction to the HDD section.

As is known from the description above, it is possible to achieve the high reliability and the speed up also in the configuration mentioned above. Further, in this case, since the physical address of the HDD can be used as it is, the function configuration of the drive selection section 1 becomes simple. Note that the function of the drive selection section 1 can be realized by the address management program similar to the case in FIG. 10.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in the description of the first embodiment according to the present invention, the data of the system region is exemplified as the data for which the reliability is required. However, the configuration in which the address space detected by the drive selection section 1 can be arbitrarily selected and an extremely important data can be stored in the non-volatile memory drive 3 in accordance with the necessity of the user is also possible.

Further, for example, in the description above, the interface of ATA including the IDE is employed. However, SCSI interface and the like can be also applied in the same manner.

The effects obtained by typical aspects of the present invention will be briefly described below.

(1) It is possible to achieve the storage device and the storage system which can automatically store the data of the system region or the data relating to the file management, which is included in the data accessed from the host to the hard disk drive (HDD), into the non-volatile memory drive.

(2) It is possible to achieve the storage device which can automatically store the data of ECC, which is included in the data accessed from the host to the hard disk drive (HDD), into the non-volatile memory drive.

(3) It is possible to achieve the storage device and the storage system which are provided with the high speed performance at a practical cost on the basis of the above-described (1).

(4) It is possible to achieve the storage device and the storage system which are provided with the high reliability at a practical cost on the basis of the above-described (1) and (2).

INDUSTRIAL APPLICABILITY

The storage device and the storage system according to the present invention are effective when applied to built-in equipment such as the car navigation system, the video recording and sound recording system and the like using the hard disk, and they can be widely applied to all of the systems including the hard disk as typified by the personal computer in addition to those mentioned above.

What is claimed is:
1. A storage device implemented in a computer system that includes a host having a processor and an ATA controller, the storage device comprising:
    a casing configured to be compatible with a hard disk drive;
    a connector detachably connectable to the host in accordance with the ATA interface standard;
    a control section disposed in said casing and configured to control inputting and outputting of data between the storage device and the host via said connector in accordance with the ATA interface standard;

a first storage section formed of flash memories disposed in said casing, connected to said control section, and configured to provide a first address space that is allocated with a lower portion of an address space allocated to the storage device as seen from said host, said first address space being arranged to store data of a system region for booting an operating system on the host, the data of the system region including a master boot record, a file management table, and the operating system; and a second storage section formed of a hard disk drive disposed in said casing, connected to said control section, and configured to provide a second address space that is allocated with an upper portion of the address space allocated to the storage device, said second address space being arranged so as to store application data to be used by an application operating on the host, and wherein the host is configured to read the data of the system region from the storage device and configure the operating system on the host based on the data of the system region;

wherein the data of the system region is duplicately stored in both the first and second storage sections, wherein, upon booting of the host, said host reads data of the system region for booting the operating system from said first address space in said first storage section formed of flash memories and executes the read data to boot the operating system on the host, and wherein said control section is configured to, upon a normal shutdown of the operating system configured on the host, perform data transfer between the data of the system region stored in the first storage section and the data of the system region stored in the second storage section so as to restore any defective data of the system region stored in said storage device.

2. The storage device according to claim 1, wherein a storage capacity of said first storage section is at least 156 M bytes.

3. The storage device according to claim 1, wherein said first storage section is a NAND flash memory.

4. The storage device according to claim 1, wherein said storage device is used as a storage medium of a car navigation system.

5. A storage system implemented in a computer system that includes a host having an ATA controller, said storage system comprising:

a casing;

an interface control section provided for connecting the casing to the host in accordance with the ATA interface standard;

a first storage unit formed of flash memories disposed in said casing and connected to said interface control section, said first storage unit being configured to provide a first address space that is allocated with a lower portion of an address space allocated to the storage system as a master drive and arranged to store data of a system region for booting an operating system on the host of said computer system, the data of the system region including a master boot record, a file management table, and the operating system; and a second storage unit formed of a hard disk drive disposed in said casing and connected to said interface control section, said second storage unit being configured to provide a second address space that is allocated with an upper portion of the addres space allocated to the storage system as seen from said host, said second address space being arranged as a slave drive and arranged to store application data to be used by an application operating on said computer system, and wherein the host is configured to, upon booting of the computer system, read the data of the system region from the storage system and configure the operating system on the host based on the data of the system region;

wherein the data of the system region is duplicately stored in both the first and second storage units, wherein, upon booting of the computer system, said computer system reads, under control of said ATA controller, data of the system region for booting the operating system from said first address space allocated to said first storage unit formed of flash memories and executes the read data to boot the operating system on the computer system, and wherein said interface control section is configured to, upon a normal shutdown of the operating system configured on the host, perform data transfer between the data of the system region in stored in the first storage unit and the data of the system region stored in the second storage unit so as to restore any defective data of the system region stored in said storage system.

6. The storage system according to claim 5, wherein said first storage unit and said second storage unit are provided in one chassis having a slot, and said second storage unit can be detached through said slot.

7. The storage system according to claim 5, wherein said first storage unit is configured with NAND flash memories.

8. The storage system according to claim 5, wherein said system is a car navigation system.

9. A storage device implemented in a computer system that includes a host having a processor and an ATA controller, the storage device comprising:

a casing configured to be compatible with a hard disk drive;

a connector detachably connectable to the host in accordance with the ATA interface standard;

a control unit disposed in said casing and configured to control inputting and outputting of data between the storage device and the host via said connector in accordance with the ATA interface standard;

a first storage unit formed of NAND flash memories disposed in said casing and connected to said control unit, said first storage unit being configured to provide a first address space that is allocated with a lower portion of an address space allocated to the storage device as a master drive and arranged to store data of a system region for booting an operating system on the host, the data of the system region including a master boot record, a file management table, and the operating system; and a second storage unit formed of a hard disk drive disposed in said casing and connected to said control unit, said second storage unit being configured to provide a second address space that is allocated with an upper portion of the address space allocated to the storage device as a slave drive and arranged to store application data to be used by an application operating on the host, and wherein the host is configured to, upon booting of the computer system, read the data of the system region from the storage device and configure the operating system on the host based on the data of the system region;

wherein the data of the system region is duplicately stored in both the first and second storage units, wherein, upon booting of the host, said host reads data of the system region for booting the operating system from said first address space allocated to the first storage unit formed of NAND flash memories and executes the read data to boot the operating system on the host, and wherein said control unit is configured to, upon a normal shutdown of the operating system configured on the host, perform data transfer between the data of the system region stored in the first storage unit and the data of the system region stored in the second storage unit so as to restore any defective data of the system region stored in said storage device.

10. A storage device for installation in a computer system that includes a host, said storage system comprising:

a casing configured to be compatible with a hard disk drive;

a control unit disposed in said casing and configured to control inputting and outputting of data between the storage device and the host of the computer system under control of an ATA controller of the host;

a first storage unit formed of flash memories disposed in said casing, said first storage unit being connected to said control unit, configured to provide a first address space which is allocated with a lower portion of an address space allocated to the storage device, and arranged to store data of a system region for booting an operating system on the host, the data of the system region including a master boot record, a file management table, and the operating system;

a second storage unit formed of a hard disk drive disposed in said casing, said second storage unit being connected to said control unit, configured to provide a second address space which is allocated with an upper portion of the address space allocated to the storage device as a slave drive, and arranged to store application data to be used by an application operating on the host; and a power source monitoring circuit provided with a condenser, and wherein the host is configured to, upon booting of the computer system, read the data of the system region from the storage device and configure the operating system on the host based on the data of the system region;

wherein the data of the system region is duplicately stored in both the first and second storage units, and wherein, upon booting of the host, said host reads, under control of said ATA controller, data of the system region for booting the operating system from said first storage unit formed of flash memories and executes the read data to boot the operating system on the host, wherein said control unit is configured to, upon a normal shutdown, of the operating system configured on the host, perform data transfer between the data of the system region in the first storage unit and the data of the system region stored in the second storage unit so as to restore any defective data of the system region stored in said storage device, and wherein, upon a sudden power-off being detected, said source power source monitoring circuit maintains a power source voltage for a predetermined time by using an electric charge accumulated in the condenser, and the control unit operates to store file management data temporarily retained at such sudden power-off into the first storage unit formed of flash memories under the power source voltage maintained by the electric charge accumulated in the condenser.

11. A computer system comprising:

a host having an ATA controller; and a storage device detachably connected to the host under control of said ATA controller, the host being configured to, upon booting of the computer system, read data of a system region from the storage device for booting an operating system on the host and configure the operating system on the host based on the data of the system region;

said storage device being allocated with an address space as seen from said host, and comprising:

a casing;

a control unit disposed in the casing and detachably connected to the host in accordance with the ATA interface standard;

a first storage unit formed of flash memories disposed in the casing and connected to said control unit, said first storage unit being configured to provide a first address space allocated with a lower portion of said address space and arranged to store the data of the system region, the data of the system region including a master boot record, a file management table, and the operating system; and a second storage unit formed of a hard disk drive disposed in the casing and connected to said control unit, said second storage unit being configured to provide a second address space allocated with an upper, portion of said address space and arranged to store application data to be used by an application operating under control of said ATA controller and said control unit, and wherein, upon booting of the host, the host reads data of the system region or booting the operating system from said first address space allocated to the first storage unit formed of flash memories and executes the read data to boot the operating system on the host, wherein the data of the system region is duplicately stored in both the first and second storage unit, wherein, upon booting of the computer system, said host reads, under control of said ATA controller and said control unit, data of the system region for booting the operating system from said first address space allocated to the first storage unit formed of flash memories and executes the read data to boot the operating system on the host, and wherein said control unit is configured to, upon a normal shutdown of the operating system configured on the host, perform data transfer between the data of the system region in the first storage unit and the data of the system region stored in the second storage unit so as to restore any defective data of the system region stored in said storage device.

* * * * *

UNITED STATES PATENT AND TRADEMARK OFFICE
CERTIFICATE OF CORRECTION

| | | |
|---|---|---|
| PATENT NO. | : 8,291,149 B2 | Page 1 of 1 |
| APPLICATION NO. | : 10/563252 | |
| DATED | : October 16, 2012 | |
| INVENTOR(S) | : Azuma et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 951 days.

Signed and Sealed this
Twenty-ninth Day of July, 2014

Michelle K. Lee
*Deputy Director of the United States Patent and Trademark Office*